Dec. 9, 1952     A. E. DRISSNER     2,620,547
CONTROL AND INDICATOR SYSTEM FOR MACHINE TOOLS

Filed Dec. 24, 1948     4 Sheets-Sheet 1

Inventor
Alfred E. Drissner
By Woodling and Krost
Attorney

Witness
Clyde H. Haynes

Dec. 9, 1952 A. E. DRISSNER 2,620,547
CONTROL AND INDICATOR SYSTEM FOR MACHINE TOOLS
Filed Dec. 24, 1948 4 Sheets-Sheet 4

INVENTOR.
Alfred E. Drissner
BY Woodling and Krost,
attys.

Patented Dec. 9, 1952

2,620,547

UNITED STATES PATENT OFFICE 2,620,547

CONTROL AND INDICATOR SYSTEM FOR MACHINE TOOLS

Alfred E. Drissner, Cleveland, Ohio, assignor to The National Acme Company, a corporation of Ohio Application December 24, 1948, Serial No. 67,219

2 Claims. (Cl. 29—37)

My invention relates to an improvement on large automatic machines for the visible control of all cam and index mechanisms from the front or from the back side of the machine. The visible control more particularly indicates externally of the machine the position of the internal cam rollers or engagement members between the "high" and "low" points on the respective tool slide cams, along with the "index" and "chuck open" positions of the machine during the cycle of operation.

Prior to this time it has been necessary for the operator to remove guards from about the machine and cover plates from windows in the machine housing and look into the oily moving parts to see when cam engagement member is on the "high" or "low" point of cam, or to see the position of a chucking cam. The oil fumes within the machine and the housing often compelled the operator to use a light or feel the cams with his fingers to determine their exact location. Generally, the operator would remove the guards and cover plates and put his hand on the cams and other moving parts, thus subjecting himself to the danger of getting his hand caught in the gears or between the cam engagement member and the cam. Should he wish to stop the machine in an idle position or at a particular point during the cycle of operation he would have to crank the machine into that position by hand. The operator could not see the position of the cam engagement member on the cam while he was cranking the machine and thus had to crank the machine a bit at a time and step around the machine to check the cam position. Many times the operator would crank the machine too far and then have to crank it backwards or crank it through a complete cycle of operation to position the cam roller on the cam exactly where he wanted it.

With my improvement on the front and rear side of the automatic machine, the operator can stop the machine at any position by watching the visible indicator and throwing out the feed clutch wherever he desires. My visible indicator is preferably made in the form of a disc having the face thereof provided with peripheral spaces showing the cycle of operation. A first of these spaces shows the "index" position of the machine. A second space on the periphery of the disc or indicator shows the "chuck open" time during which new work stock is inserted in the work supporting spindle. Similarly, a third space shows the travel of the tool slide cams and the position of the cam rollers on the tool slide cams including the "high" and "low" points of the cams. The open part of the face of the dial represents the idle time of the machine. The disc can be easily read by the operator so that he can stop the machine at any of these positions during the cycle of operation by throwing out the feed clutch whenever he desires.

Although my improvement is very simple and inexpensive to mount on the machine, it saves much time for the operator, as well as making his work much safer. With my indicator on the front and back sides of the machine, the operator does not have to remove any guards or cover plates from the frame housing to check the position of the cam rollers on the working cams or the position of the working parts during the cycle of operation. The operator does not have to look into oily fumes or put his fingers on moving parts. The indicating disc on either side of the machine indicates exactly when a cam roller is in line with the "high" or "low" point of its operating cam. The operator can also stop the machine in the small space marked "chuck open" without hand cranking the machine to insert a new bar of stock in a work supporting spindle. This saves much time and speeds the production output of the machine, thus making the operating costs more economical.

Therefore, one of the objects of my invention is to provide an external visible indicator to safely indicate the position of the cam engagement members on the cams located internally of the machine.

Another object of my invention is to provide a safe indicator whereby the operator does not have to subject himself to dangerous moving gears to determine the position of the cam engagement members on their respective cams.

Another object of my invention is to provide an economical exterior indicator which will efficiently, correctly and safely indicate to the operator the position of the cam engaging members on the tool slide cams located internally of the machine.

Another object of my invention is to provide a very simple, inexpensive improvement on automatic spindle machines whereby the operator can check the location of the tool slide rollers on the working cams at any instant during the cycle of operation of the machine and without removing guards and cover plates from the frame of the machine.

Another object of my invention is to provide an operating panel including an exterior indicator and a machine stopping device whereby the operator can stop the machine at a particular position by observing the external indicator and operating the stopping device.

A further object of my invention is to provide an exterior indicator to indicate the position of the working parts of the machine at any time during a cycle of operation.

A still further object of my invention is to provide indexed visible indicator discs mounted externally of the machine on an indicator shaft which is synchronously geared to an operating cam shaft of the machine.

Other objects and a fuller understanding of the invention may be had by referring to the following description and claims, taken in conjunction with the accompanying drawings, in which:

Figure 1:
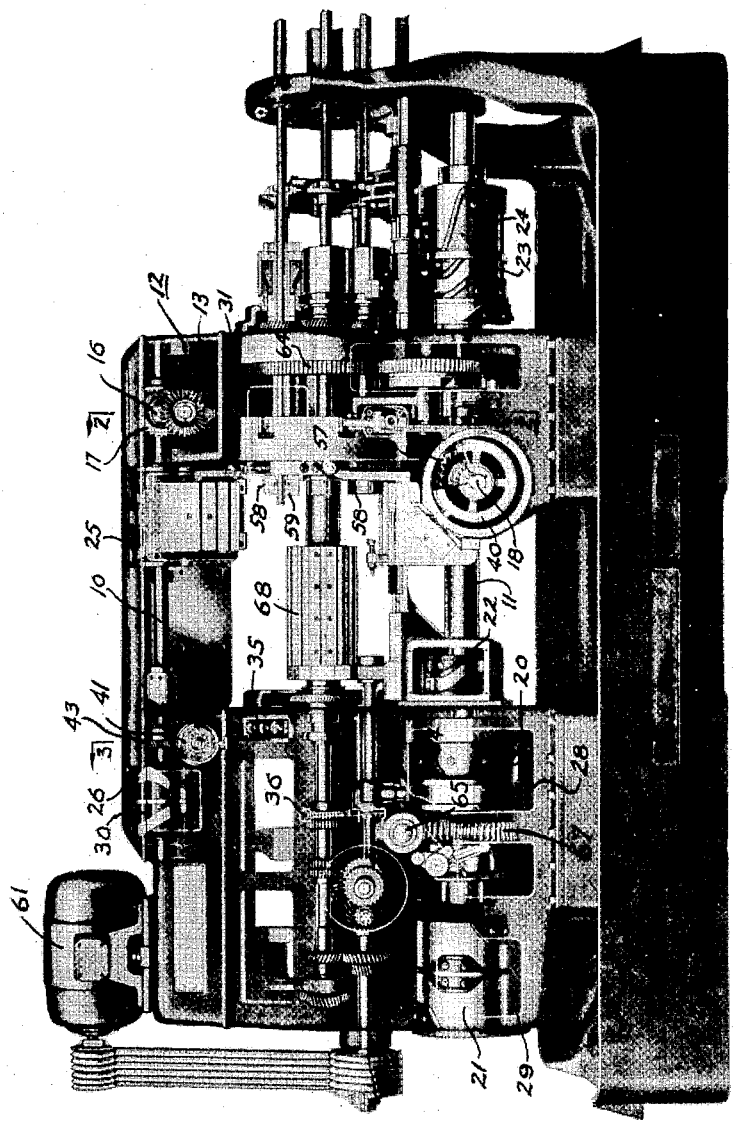
Figure 1 is a front picture view of an automatic spindle machine with the working cams and other internal gearing superimposed thereon and illustrating the position of the front indicator dial.

My improvement of a visible indicator mechanism is illustrated in my drawings as being mounted in an automatic spindle machine, however, it is understood that this visible indicator may be incorporated in many other machines which have cam engagement members or cam rollers engaging working cams internally of the machine. Although I generally speak of my indicator as indicating externally of the machine the position of the cam engagement members or rollers on the respective working and tool slide cams internally of the machine, it is understood that this indicator will also indicate the idle time of the machine and the chucking time. In Figure 1 of my drawing I illustrate a front picture view of a large automatic spindle machine with the working cams and other internal gearings superimposed thereon to better show the position of the cams within the machine housing. This large automatic spindle machine operates in a cycle of operation, as shown by the cam diagram in Figure 4, and similar to the spindle machine described in the patent to C. W. Simpson et al., which was issued March 10, 1936, and bears Patent No. 2,033,490.

Figure 2:
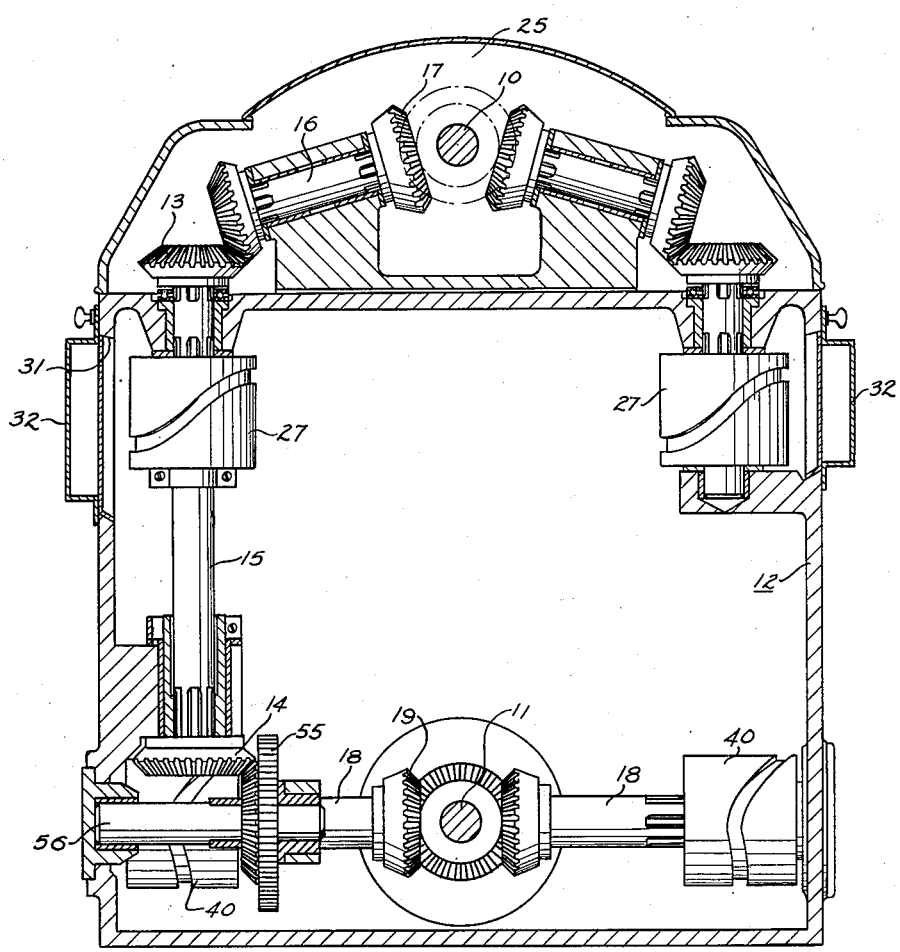
Figure 2 is an enlarged cross-sectional view along the line 2—2 of Figure 1 with certain parts omitted and showing the driving connection of the top cam shaft to the bottom cam drum shaft.

The automatic spindle machine illustrated in Figure 1 has an upper cam shaft 10 and a lower or main cam shaft 11 mounted in a housing or frame 12. The upper cam shaft 10 and the lower or main cam shaft 11 are gearingly connected together by a train of beveled gears 13 and 14 interconnected by gear shaft 15, which, as is best illustrated in Figure 2 of my drawings, extends vertically and substantially at right angles to the upper cam shaft 10 and the main cam shaft 11. A gear shaft 16 and beveled gears 17 connect the beveled gears 13 to the upper cam shaft 10. The shaft 16 extends at an angle to the shaft 10 and also to the shaft 15. The beveled gears 14 are geared by means of a gear 55 on a shaft 56 to a side cam shaft 18 which extends transverse of the main cam shaft 11 and is geared thereto by beveled gears 19 (see Fig. 2). These gears along with the gear shafts synchronously transmit the rotational movement of the main cam shaft 11 to the upper cam shaft 10. As is illustrated in Figures 1 and 2 of my drawings these cam shafts, along with the gears and shafts interconnecting them, are entirely enclosed in and supported by the housing 12 of the automatic spindle machine. The machine also has an indexible spindle carrier 57 carrying work supporting spindles 58 and indexed by mechanism 64 from one tooling station to another in a cycle of operation as indicated in the cam diagram of Figure 4. Each of these work supporting spindles 58 is equipped with a chuck 59 to grip and hold the stock while it is being machined in the tooling stations. The tools which machine the stock in each of the operations have been omitted from the drawing for purposes of clarity. The machine is preferably driven by an electric motor 61, controlled by a suitable switch 35 or 35A. This motor drives the main drive shaft 11 through a gear train 67 and a hand operated clutch 65 having a handle 36, which is outlined in white in Figure 1. The clutch 65 is also operable by a handle 36A on the rear of the machine, as shown in Figure 6.

The main cam shaft 11 supports and thereby rotates an end tool slide drum 20, threading slide drums 21, a stock feed stop drum 22, a chucking drum 23, and a stock feed drum 24. Similarly, the side cam shaft 18, which extends transversely to the main shaft 11, supports and rotates lower side slide drums 40. The upper cam shaft 10 supports and rotates upper side slide drums 25, and upper threading attachment cam drums 26. Likewise, the interconnecting gear shaft 15, as is illustrated in Figure 2 supports and rotates an intermediate side slide cam drum 27. While the machine is operating, the shafts and drums are continuously oiled by a lubricant pump 62 and lubricant distribution system 63, thus completely filling the inside of the housing with oil vapors.

The front and back sides of housing 12 are provided with windows which provide access to each cam drum. In Figure 1 these windows are outlined in white lines; the white line 28 outlining the window for giving access to the tool slide cam drum 20; the line 29 outlining the window for giving access to the threading slide cam drum 21; the line 30 outlining the window for giving access to the threading attachment cam drum 26; and the line 31 outlining the window for giving access to the intermediate side slide cam drum 27. Each of these windows is provided with a closing plate 32 as shown in Figure 2. It is understood that windows are provided in both the front and back side of the machine, and that the windows herein identified are illustratively used and do not necessarily represent the exact number of windows or the exact position of the windows in the machine.

Figure 6:
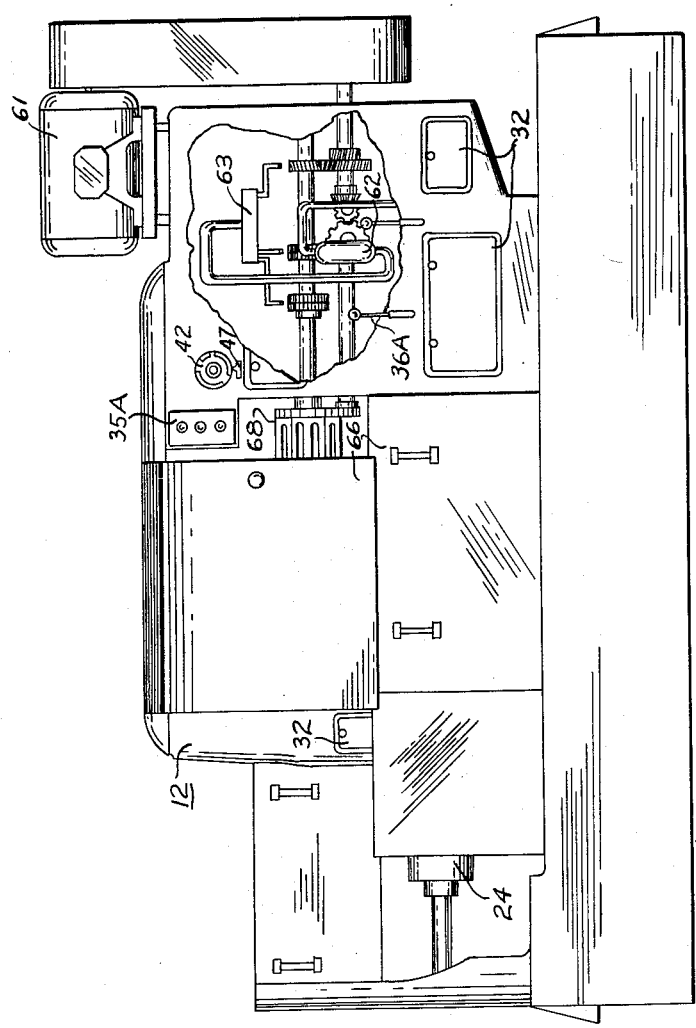
Figure 6 is a rear view of the machine with the exterior partly broken away and with covers and guards in place.

Large guards 66, shown in Figure 6, completely enclose the tooling area and the working parts of the machine to prevent accidents. The operator cannot even see the plates 32 in their respective windows when these large guards are mounted on the frame to safety enclose the moving parts of the machine. The operator must first remove these guards and then remove one of the cover plates 32 from its window to see a cam drum within the housing 12. This removing of the cover plates and guards is dangerous and permits oil fumes in the housing 12 to exit into the air all about machine. The operator cannot see the chucking or stock feeding cam drums 23 and 24 while cranking the machine or while looking through any of these windows.

For the purpose of clearly illustrating my invention I will refer to the tool slide cam drum 10 20 and the respective cam or roller engagement member 33 which engages the cam 34 on the tool slide drum 20 to move the end tool slide 68. It is understood that similar cam engagement members or rollers and cams are provided on the other cam drums for operating the chucking mechanism and the feeding mechanism of the machine as well as other tooling devices. These cam drums operate in synchronous timed relation and in a cycle of operation as indicated by the cam diagram of Figure 4. It is also understood that the other controlling cam drums have different locations in the machine and are suitably connected to the main cam shaft 11 and the upper cam shaft 10 as hereinbefore described to operate in synchronous movement with the tool slide drum 20.

Figure 4:
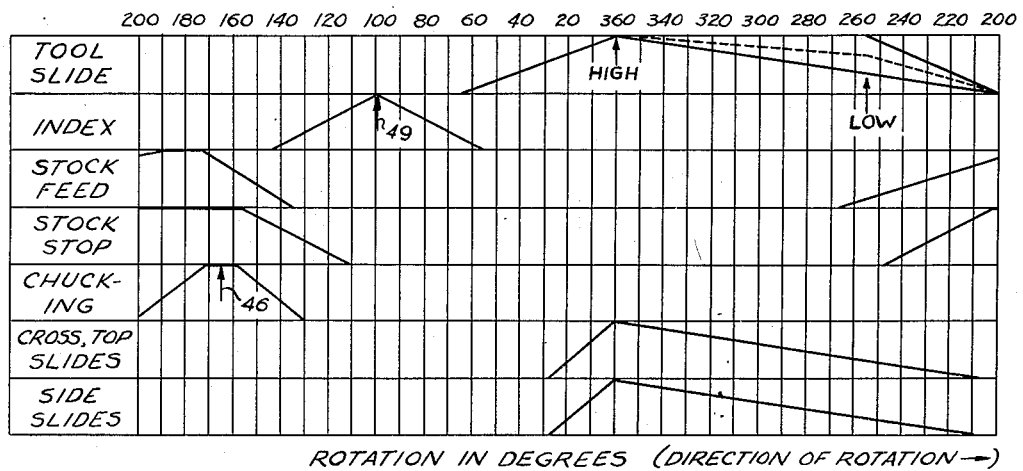
Figure 4 is a cam diagram for a particular operation of the machine.

The working cycle of the machine as is illustrated in the cam diagram of Figure 4 includes a time for chuck opening and closing, a time for the travel of tool slides, a time for indexing, and an idle time. Many times the operator would like to stop the machine during one of these times so that the working parts of the machine are in a particular position. Previously, it has been necessary for him to remove the guards which enclose the working parts of the machine and then remove a cover plate 32 from a window in the front or back side of the machine and crank the machine by hand until the cam drums are in correct position to position the working tools or chuck as he wants them. I have discovered that it is very convenient and saves much time if the operator can know the exact position of the cam engagement members or rollers on the respective cams throughout the working cycle of the machine.

Therefore, I have provided a front visible indicator dial or disc 41 and a rear visible indicator or disc 42. These visible indicators 41 and 42 are preferably of the disc type and have marks on the face thereof peripherally spaced, as shown in the enlarged Figure 5, to show the different periods of time of the working cycle of the machine. A pointer 47 is mounted on the machine housing 12 by screws 51 for each of the dial indicators 41 and 42. Each pointer 47 is aligned with its respective disc or dial to facilitate the reading of the dial by the operator.

With my indicator dials 41 and 42 the operator can stand in front of the machine or in back of the machine to operate it and does not have to keep stepping around the machine. I have found it also advisable to mount a main electrical switch 35, which controls the starting and stopping of the drive motor of the machine next to the indicator dial. It is also noted that the hand operated clutch 36, which may be thrown out to stop the machine is within reach of the operator while he is watching the indicator dial.

Figure 3:
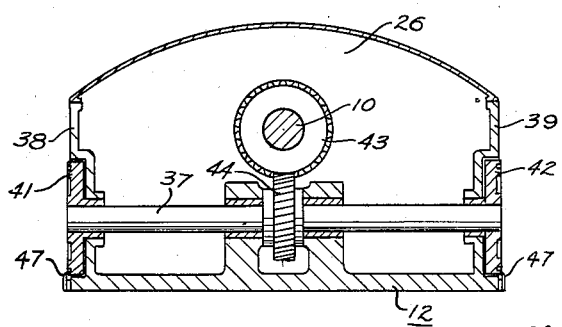
Figure 3 is an enlarged cross-sectional view along line 3—3 of Figure 1 showing the gearing of the external indicators to the top cam shaft.

In Figure 3 I illustrate an indicator shaft 37 extending through the front wall 38 and the rear wall 39 of the machine housing 12 to support and rotate these visible indicator dials 41 and 42.

The front visible indicator 41 is fastened to one end of this indicator shaft 37 and the rear visible indicator 42 fastened to the other end. It is understood that one of these visible indicators may be omitted, but I have found it convenient to the operator to have the indicators or dials on both the front and back sides of the machine. The indicator shaft 37 is intergeared with the upper cam shaft 10 to provide a synchronous movement therebetween and thus provide synchronous movement with the operating cam drums in the machine, whereby each indicator dial indicates the position of a cam engagement member on the respective cam at any time during the operation of the machine. I have provided the upper cam shaft 10 with a gear 43 and the indicator shaft 37 with a gear 44 which is in mesh with the gear 43 to interconnect these shafts 37 and 10.

Figure 5:
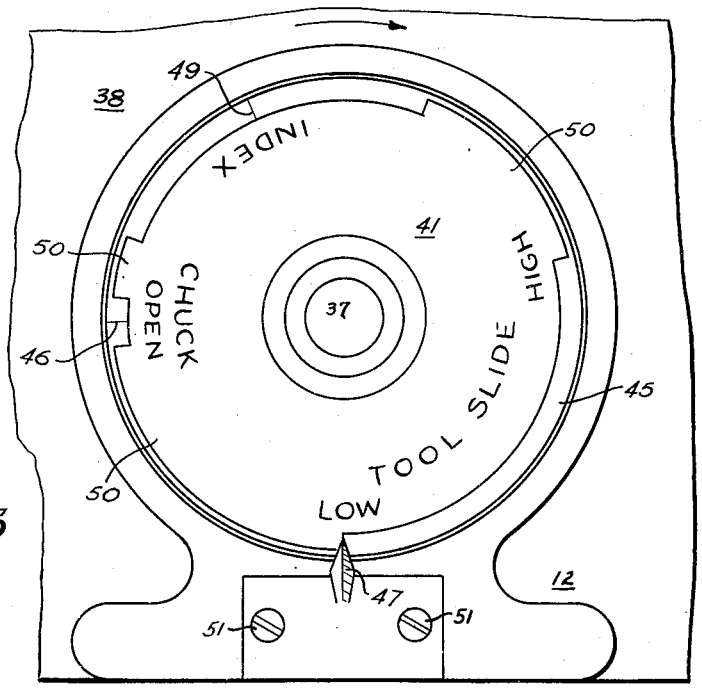
Figure 5 is an enlarged fragmentary view of the external indicator dial on the front side of the machine with marks on the indicator dial peripherally spaced in coordination with the cam diagram of Figure 4.

The front visible indicator dial 41, illustrated in Figure 5, is peripherally marked for a complete cycle of operation as shown in the cam diagram of Figure 4. In this automatic spindle machine one revolution of the main cam shaft 11 controls a complete cycle of operation of the machine. This front indicator dial 41, as is best illustrated in Figure 5, shows marks about the periphery thereof representing the "high" and "low" points on the tool slide cams, the "chuck open" position, and "index" position of the machine as well as the idle time during one cycle of operation. The travel of cam engagement member 33 on cam 34 of tool slide drum 20 between the "high" and "low" points is represented on the disc by the "tool slide" space 45. The "high" point on the indicator disc or dial 41 of Figure 5 is the "high" point as indicated by an arrow on the cam diagram of Figure 4. Similarly, the "low" point on the indicator dial is the "low" point as indicated by an arrow on the cam diagram.

In the tool slide part of the cycle of operation of the machine, as shown by the cam diagram on Fig. 4, the tool on the tool slide 68 first approaches the work piece from its resting position until it reaches the low point; then the tool begins to lead or feed into the work piece. The low point indicates the position of the tools as they have moved forward to the work piece and are ready to start tooling the work piece held in a work supporting spindle 58. The tool leads or feeds into the work piece until the cam engagement member reaches the high point on the tool slide cam. The high point, as indicated by the arrow on the cam diagram on Figure 4, is synonymous with the position of tools when they have reached the end of the tooling on a work piece held in the work supporting spindle 58 and are about to be retracted from the work piece. After reaching the high point the tool is returned from the work piece to its resting position. In the cam diagrams, I have illustrated the approach to the low point of the cam and the lead or feed in position of the cam (that part of the cam between the low and high points) as having the same speed. However, the approach speed may be faster than the lead or feed in speed as indicated by the dotted line in Figure 4.

The machine may be stopped with the cam engaging member 33 on any other position on the cam 34 without dangerously opening the housing and without hand cranking the machine into position. When the operator wants to stop the machine with the cam engagement member or cam roller 33 on the "high" point of the cam 34 on cam drum 20, he simply and safely watches the external indicator dial 41 until the pointer 47 is aligned with the correct position, labeled "high," on the tool slide portion 45 and throws out the within the reach clutch 36. Figure 1 of my drawings shows the indicator dial or disc with the cam engagement member 33 on the low part of the cam 34 of the tool slide drum 20, which is carried internally of the housing by the main or lower cam shaft 11. The operator does not have to remove the guards, which completely cover the working tools of the machine, and the cover plates on the windows of the frames to determine exactly the position of the cam engagement members on the cams.

The Index space on the periphery of the dial covers the space during which time the machine indexes as indicated on the cam diagram of Figure 4 and a center line 49 thereon represents the midway position on the cam diagram as indicated by the arrow 49. It is noted that during this indexing time the working tools are all out of the way and in their resting place, the chucks are all closed on the respective stock pieces, and the spindles are indexed from the tooling station to the next tooling station. The operator can stop the machine during this indexing time by aligning the Index space of the dial with the pointer 47 and throwing out the feed clutch or pushing the stop button of the main electrical switch. Throwing out the feed clutch with the center line 49 of the Index space aligned with the pointer 47 stops the machine at the midway position of the indexing time as indicated by arrow 49 on the cam diagram of Figure 4.

The "chuck open" space of the indicator dial covers a small part of the periphery of the dial because the chuck 59 in spindle 58 is opened and closed quickly by chucking cam drum 23. In Figure 5 the center of the "chuck open" space has a guide line 46 which indicates to the operator when the chuck is open. The guide line 46 represents the midway position on the chucking part of the cam diagram as indicated by the arrow 46. Thus when the operator wants to stop the machine with the chuck 59 in spindle 58 open, as indicated by the arrow 46 in the cam diagram, he aligns the "chuck open" space of the dial 41 with the dial pointer 47 and throws out the feed clutch 36. Throwing out the feed clutch 36 stops the operation of the machine with the chuck open.

The peripheral spaces of the indicator dial identified by the reference character 50 represent the noncritical and idle times of operation of the machine. The main times at which the operator must know the exact position of the cam engagement members on the cams are during the tool slide, the indexing, and the chucking operations. Thus, the remaining part of the cycle of operation has been represented on the dial by the reference character 50. The operator can stop the machine at any desired position by disconnecting the feed clutch 36 mounted on both sides of the machine. The main electrical switch 35 of the machine, which is mounted on both the front and back sides of the machine also may be operated to start and stop the machine.

My indicator dials not only eliminate the danger of the operator getting hurt, but also are very practical and very useful to the operator of the machine. In operating the machine, the operator needs only to watch either of the visible indicator dials 41 or 42 to know exactly when the chuck will open and close and to know exactly when the cam engagement member will reach a predetermined point on the cam rotating internally of the housing 12. The operator does not have to remove any guard and cover plates and thereby endanger himself while observing or feeling the rotating cams in the machine.

When the pointer 47 and desired mark on the indicator disc or visible indicator are aligned, the operator shuts down the motor of the machine by pushing the stop button of switch 35 or stops the machine from operating by throwing out the feed clutch. The operator can stop the machine while it is at an idle period or at any other given time during the cycle of operation, and without hand cranking the machine. The operator, thus, saves much time and work every time a new bar or piece of stock is inserted in the chuck, as well as in setups and other operations, since he can know the exact position of the internal cam rollers on the internal cams by watching the external indicator dial, which is peripherally spaced according to the respective cam diagrams.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A control and indicator system for an automatic spindle machine having a frame with a front and a back and carrying a given plurality of work holding spindles each provided with a chuck to chuck a workpiece, mechanism to index said spindles to positions equal in number to said given plurality with one position of each of said spindles being a work chucking position to load a new workpiece, a tool slide reciprocable forward and backward once each cycle and adapted to carry tools of a number equal to said given plurality to tool the work held by the spindles, a tool slide cam drum rotated once each cycle to drive said tool slide forward and backward by means of a cam follower, a chucking cam drum operable once each cycle to open and close the chuck on the one of said spindles which is in the work chucking position, an electric motor driving said cam drums by means of a geared power train and a main cam shaft, an upper cam shaft geared to said main cam shaft, a lubrication system for lubricating the moving parts of said machine and which creates a lubricant mist-laden atmosphere, and guards enveloping and hiding said moving parts and confining said lubricant mist, said control and indicator system comprising, a control feed clutch disposed in said power train to selectively control the power applied to said cam drums and cam shafts, first and second manual clutch levers disposed on the front and rear of and externally of said machine at a location near said tool slide, first and second start-stop electrical switches in circuit relationship with said electric motor to control the energization of same and physically disposed on the front and rear of and externally of said machine near said manual clutch levers, first and second revoluble indicator dials disposed on the front and rear of and externally of said machine near said manual clutch levers, a stationary pointer cooperating with each of said indicator dials, indicia on the periphery of each of said dials indicating an open condition of the chuck which is in the work chucking position, indicating the indexing interval between successive cycles, and indicating the high and low points of the cam on the tool slide cam drum, a revoluble indicator shaft fixedly attached to said indicator dials and journaled in said frame near said upper cam shaft, and gears interconnecting said upper cam shaft and said indicator shaft to rotate said indicator shaft once each cycle.

2. A control and indicator system for an automatic spindle machine having a frame carrying a given plurality of work holding spindles each provided with a chuck to chuck a workpiece, mechanism to index said spindles to positions equal in number to said given plurality with one position of each of said spindles being a work chucking position to load a new workpiece, a tool slide reciprocable forward and backward once each cycle and adapted to carry tools of a number equal to said given plurality to tool the work held by the spindles, a tool slide cam drum rotated once each cycle to drive said tool slide forward and backward by means of a cam follower, a chucking cam drum operable once each cycle to open and close the chuck on the one of said spindles which is in the work chucking position, an electric motor driving said cam drums by means of a geared power train and a main cam shaft, an upper cam shaft geared to said main cam shaft, a lubrication system for lubricating the moving parts of said machine and which creates a lubricant mist-laden atmosphere, and guards enveloping and hiding said moving parts and confining said lubricant mist, said control and indicator system comprising, a control feed clutch disposed in said power train to selectively control the power applied to said cam drums and cam shafts, a clutch lever disposed externally of said machine at a location near said tool slide, a start-stop electrical switch in circuit relationship with said electric motor to control the energization of same and physically disposed externally of said machine near said manual clutch lever, a revoluble indicator dial disposed externally of said machine near said manual clutch lever, a stationary pointer cooperating with said indicator dial, indicia on the periphery of said dial indicating an open condition of the chuck which is in the work chucking position, indicating the indexing interval between successive cycles, and indicating the high and low points of the cam on the tool slide cam drum, a revoluble indicator shaft fixedly attached to said indicator dial and journaled in said frame near said upper cam shaft, and gears interconnecting said upper cam shaft and said indicator shaft to rotate said indicator shaft once each cycle.

ALFRED E. DRISSNER.

REFERENCES CITED

The following references are of record in the file of this patent:

UNITED STATES PATENTS

| Number | Name | Date |
| --- | --- | --- |
| 1,449,554 | Schoonover | Mar. 27, 1923 |
| 1,823,883 | Bleeker | Sept. 22, 1931 |
| 2,033,490 | Simpson et al. | Mar. 10, 1936 |
| 2,196,231 | Ridgway | Apr. 9, 1940 |
| 2,279,569 | Jelinek et al. | Apr. 14, 1942 |
| 2,416,539 | Nenninger et al. | Feb. 25, 1947 |
| 2,456,139 | Miller et al. | Dec. 14, 1948 |